United States Patent
Spiegel et al.

(10) Patent No.: US 7,681,237 B1
(45) Date of Patent: Mar. 16, 2010

(54) SEMI-SYNCHRONOUS SCANNING OF MODIFIED FILES IN REAL TIME

(75) Inventors: Mark Spiegel, West Hills, CA (US); Melissa Mendonca, Los Angeles, CA (US); Haik Mesropian, Glendale, CA (US); Edmund White, Beaverton, OR (US)

(73) Assignee: Symantec Corporation, Mountain View, CA (US)

( * ) Notice: Subject to any disclaimer, the term of this patent is extended or adjusted under 35 U.S.C. 154(b) by 1245 days.

(21) Appl. No.: 10/846,184

(22) Filed: May 13, 2004

(51) Int. Cl.
*G06F 11/00* (2006.01)
*G06F 12/14* (2006.01)
*G06F 12/16* (2006.01)
*G08B 23/00* (2006.01)

(52) U.S. Cl. ............... 726/24; 713/165; 713/187; 713/188; 719/329; 717/131; 712/220

(58) Field of Classification Search ............ 726/24
See application file for complete search history.

(56) References Cited

U.S. PATENT DOCUMENTS

| | | | |
|---|---|---|---|
| 6,134,627 A * | 10/2000 | Bak | 711/6 |
| 6,594,686 B1 * | 7/2003 | Edwards et al. | 709/203 |
| 6,842,861 B1 * | 1/2005 | Cox et al. | 713/188 |
| 7,024,403 B2 * | 4/2006 | Kyler | 707/3 |
| 7,036,147 B1 * | 4/2006 | Hursey | 726/24 |
| 7,188,367 B1 * | 3/2007 | Edwards et al. | 726/24 |
| 2004/0230794 A1 * | 11/2004 | England et al. | 713/164 |

* cited by examiner

*Primary Examiner*—Matthew B Smithers
*Assistant Examiner*—Shewaye Gelagay
(74) *Attorney, Agent, or Firm*—Fenwick & West LLP

(57) ABSTRACT

In the method of the present invention, an anti-virus scan of a file is performed in real time. A thread manager (101) detects (202) that an activity concerning a file has been initiated by a first thread. Responsive to the detection, the thread manager (101) determines (204) that a scan of the file should be conducted. The thread manager (101) initiates (206) the scan of the file by a second thread, thereby enabling the first thread to complete the activity concerning the file and to perform other tasks while the scan occurs. The thread manager (101) blocks (212) access to the file while the scan occurs.

26 Claims, 5 Drawing Sheets

SEMI-SYNCHRONOUS SCANNING OF MODIFIED FILES IN REAL TIME

TECHNICAL FIELD

This invention pertains generally to computer security, and more specifically to semi-synchronous antivirus scanning of files in real time.

BACKGROUND ART

Computer systems face a threat of attack by malicious computer code, such as worms, viruses and Trojan horses. As used herein, "malicious computer code" is any code that enters a computer without an authorized user's knowledge and/or without an authorized user's consent.

Some current antivirus protection systems are configured so that an anti-virus scan can be performed when an application modifies and then closes a file. Such an anti-virus scan is performed in the context of the thread performing the closing of the file, thus blocking the closing thread from performing other activities until this scan is completed. In the meantime, other activities involving this file, such as a request to open the file, are also prevented until the scan is completed. Waiting for this scan to complete can be a very time-consuming process, particularly when the scan is being conducted on a container file that must be decomposed into parts, each of which need to be scanned separately. While the scan is occurring, the thread closing the file can appear to be unresponsive. The system can be configured to permit access of the file before the scan is complete, making the application appear more responsive, but there is a risk that malicious code may be accessed before it is repaired. There is currently no method for freeing the closing thread so that it can perform other tasks while the scan is occurring, without compromising the security of the system.

Similarly, some current anti-virus protection systems are configured to perform a scan when an application opens a file. Such an anti-virus scan is performed in the context of the thread performing the opening of the file, thus blocking the opening thread from performing other activities until this scan is completed and also preventing other activities involving this file until the scan is completed. While the scan is occurring, the thread opening the file can appear to be unresponsive. There is currently no method for releasing the opening thread so that it can perform other tasks while the scan is occurring, without comprising the security of the system.

What is needed are methods, computer readable media and systems that perform semi-synchronous scanning of files with minimum performance impact on threads closing or opening files.

DISCLOSURE OF INVENTION

The present invention comprises methods, systems, and computer readable media for performing a real time anti-virus scan of a file. A computer readable medium includes hardware, such as a hard drive, compact disk read-only memory (CD-ROM), DVD, a solid-state memory device. A thread manager (101) detects (202) that an activity concerning a file has been initiated by a first thread. Responsive to the detection, the thread manager (101) determines (204) that a scan of the file should be conducted. The thread manager (101) initiates (206) the scan of the file by a second thread, thereby enabling the first thread to complete the activity concerning the file and to perform other tasks while the scan occurs. The thread manager (101) blocks (212) access to the file while the scan occurs.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
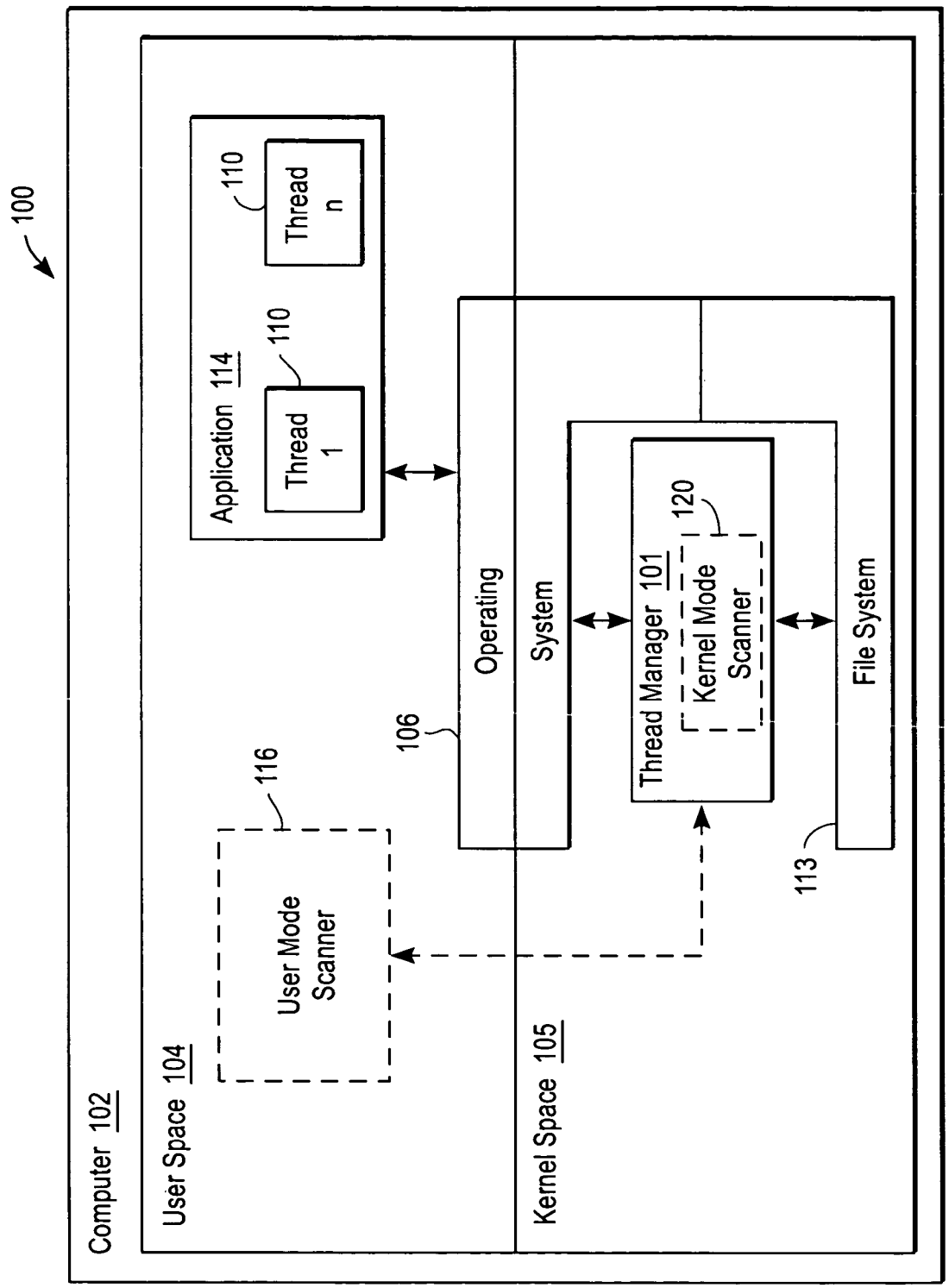
FIG. 1 is a block diagram illustrating a high level overview of a system for practicing some embodiments of the present invention.

FIG. 1 illustrates a high level overview of a system 100 for performing some embodiments of the present invention. A thread manager 101 performs an anti-virus scan of a file in real-time. It is to be understood that although the thread manager 101 is illustrated as a single entity, as the term is used herein a thread manager 101 refers to a collection of functionalities, which can be implemented as software, hardware, firmware or any combination of the three. Where a thread manager 101 is implemented as software, it can be implemented as a standalone program, but can also be implemented in other ways, for example as part of a larger program, as a plurality of separate programs, or as one or more statically or dynamically linked libraries.

Referring to FIG. 1, the thread manager 101 executes on a computer 102. In FIG. 1, the thread manager 101 is shown executing in kernel space 105, but in other examples the thread manager 101 can execute in user space 104 instead. In addition, some functionalities of the thread manager 101 can execute in kernel space 105 while others execute in user space 104. In the embodiment illustrated in FIG. 1, there is shown an application 114, (e.g., Microsoft Word®, Adobe Acrobat®, or any other type of application or program). In addition, the application 114 can be the operating system 106, itself. In the embodiment illustrated in FIG. 1, the application 114 attempts to perform an activity concerning a file. For example, the application 114 can attempt to close the file or open the file. The application 114 could alternatively be attempting to read the contents of a file that is open, modify the file, or perform any other type of activity concerning the file.

In FIG. 1, the application 114 is illustrated as having two threads 110: thread 1 and thread n. Of course, the application 114 may have only one thread 110, or the application 114 may have more than two threads 110. The application 114 illustrated in FIG. 1 is running in user space 104. The low-level file input/output underlying attempted file access can be executed in user space 104 or in kernel space 105, and can be intercepted by the thread manager 101. In some embodiments, there is more than one application 114, and the interactions between applications 114 are managed in manner similar to the managing of activity of threads of a single application 114 as described herein.

When the application 114 attempts to perform an activity concerning a file, the application makes a request (directly or indirectly) to the operating system 106 to perform this action. The operating system 106 can be any one of current standard operating systems, such as Microsoft Windows®, Linux®, UNIX®, PalmOS®, and the like. The operating system 106 notifies the file system 113 of the file activity request. The file system 113 can be a part of the operating system 106, as illustrated in FIG. 1, or it can be separate from the operating system 106. In some embodiments, the operating system 106 includes both the file system 113 and the thread manager 101, and in other embodiments these can all be separate.

As shown in FIG. 1, the thread manager 101 can plug into the operating system 106 as a filter, such that any file input/output operations pass through the thread manager 101 before they reach the file system 113. Thus, the thread manager 101 can be implemented as a file system filter driver, which filters all attempts to access files. When the operating system 106 attempts to notify the file system 113 of the file activity request, the thread manager 101 can intercept the file activity to conduct a scan if it is determined that a scan is needed. An operating system 106 defined interface could be used to allow the thread manager 101 to intercept the file activity. In some embodiments, the thread manager 101 does not plug into the operating system 106, but is separate. Additionally, the thread manager 101 can intercept the file activity path at a number of different levels. For example, the thread manager 101 could make calls to operating system 106 that request performance of a file activity. In some embodiments, when the operating system 106 is notifying the file system 113 of the file activity, the operating system 106 can also notify the thread manager 101 of the attempted file activity.

When the thread manager 101 detects that an activity concerning a file has been attempted, the thread manager 101 then determines whether or not the file should be scanned for malicious code. For example, a thread manager 101 can be configured to perform a scan of each file that is being closed in which the file content was modified since the last scan of the file. Thus, in this example, each time a file is closed, the thread manager 101 will determine whether or not the file has been modified since the last scan. If the file has been modified, the thread manager 101 will determine that the file should be scanned. Other criteria can be used by the thread manager 101 to determine whether to scan the file, as desired.

If the thread manager 101 determines that a scan is not needed, the file activity requested will be allowed to proceed. If the thread manager 101 determines that a scan is needed and the file is not already currently being scanned, the thread manager 101 will use a thread 110 in a user mode scanner 116 or a thread 110 in a kernel mode scanner 120 to perform the scan. The kernel mode scanner 120 can be implemented as part of the thread manager 101 as illustrated or can be a separate component of the system 100 as desired. In some embodiments, the system 100 is configured to include both a kernel mode scanner 120 and a user mode scanner 116.

The thread manager 101 also gathers information about the file being accessed and dispatches this information to the thread 110. The scanning thread 110 begins the scan of the file. The activity that was requested concerning the file is delayed only long enough for the thread manager 101 to dispatch the scan to a thread in scanner 120 and/or 116. Once the scan is dispatched, the file activity is allowed to be completed through the operating system 106 and the application 114 from which the file activity request was initiated. Thus, the file system 113 is able to access the file, and the file activity can be completed in most cases.

The thread 110 of application 114 that attempted the file activity is now released to conduct other tasks, without being blocked due to the scanning of the file. If a user makes a request of the application 114, the application 114 will not appear busy and the request will not be delayed due to the scan. However, in some embodiments, access to the file that is currently being scanned is temporarily blocked during the scan.

As an example, if a thread 110 of application 114 attempts to close a file that requires scanning, the thread manager 101 will dispatch the scan to a scanning thread 110 and the application 114 thread 110 will be released to perform other activities after completing the close. However, if thread 110 then attempts to reopen the file, the thread 110 can be blocked from reopening the file until the scan of the file has been completed. Thus, this is a semi-synchronous scan of the file. The scan is asynchronous from the point of view of the thread 110 that is attempting to close the file, since the thread 110 does not perform the scan, and is thus not prevented from conducting other tasks while the scan occurs. However, the scan is synchronous because no access (including by thread 110) is allowed to the file until the scan is completed. The only thread 110 permitted to access the file during the scan is the thread 110 in user mode scanner 116 or kernel mode scanner 120 that is conducting the scan.

In many current systems, a thread 110 attempting file activity is blocked from performing other tasks while a scan of the file occurs, thereby possibly making the application 114 appear unresponsive. Semi-synchronous scanning allows the thread 110 to be released to perform other tasks, thereby making the application 114 appear responsive. Thus, instead of forcing a thread 110 to wait while a container file is decomposed and its composite files are each scanned (a potentially time-consuming process), the thread 110 is permitted to conduct other activities once the scan is dispatched to a different thread 110.

Figure 2:
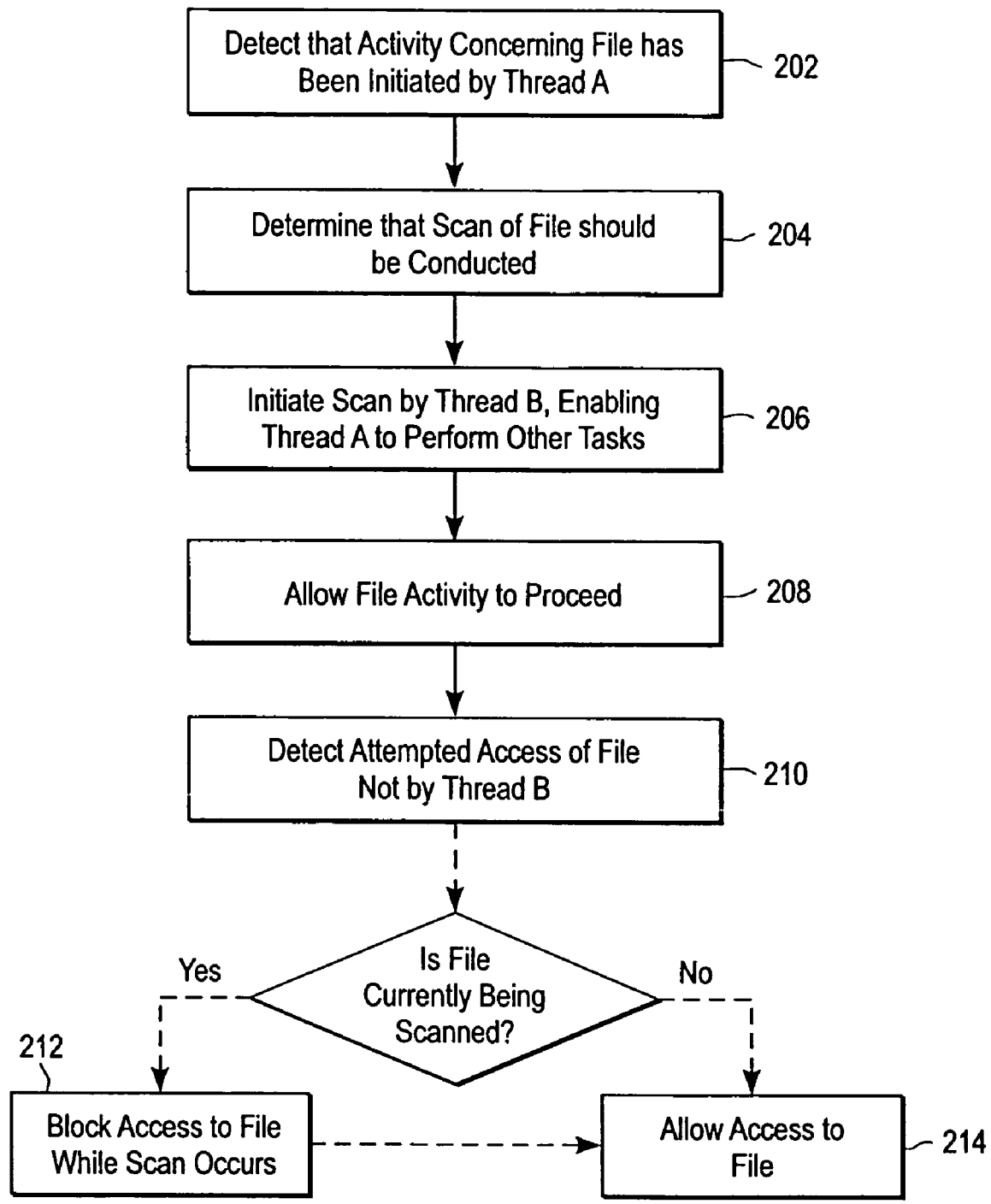
FIG. 2 is a flowchart illustrating steps for performing some embodiments of the present invention.

Referring now to FIG. 2, there is shown a flowchart illustrating a high-level overview of steps for performing some embodiments of the present invention. In some embodiments, the thread manager 101 detects 202 that an activity concerning a file has been initiated by a thread 110, which is referred to here as thread A for ease of readability. In addition, multiple threads can initiate an activity concerning a particular file at one time, so what is referred to as thread A can comprise multiple threads.

After detecting 202 that a file activity has been initiated, the thread manager 101 determines whether a scan of a file should be conducted. If the thread-manager 101 determines 204 that a scan should be conducted, the thread manager 101 will then initiate 206 the scan by another thread 110 in user mode scanner 116 or kernel mode scanner 120, thereby enabling the thread A to perform other tasks. For ease of readability, this thread 110 of user mode scanner 116 or kernel mode scanner 120 will be referred to as thread B. As discussed above, the thread manager 101 will gather information concerning the file, and dispatch that information to thread B.

By dispatching the scan to thread B, the thread manager 101 allows 208 the file activity 101 to proceed. Thus, thread A can complete the close of the file, for example. Thread A is only delayed in closing the file long enough for the scan to be dispatched to thread B.

In some embodiments, the thread manager 101 might then detect 210 attempted access of the file not by thread B. This is an optional step, as sometimes no such file access will be attempted. In some embodiments, numerous processes may attempt to access the file, including a thread 110 of application 114. In some embodiments, thread A attempts to re-access the file after completing the previously described file activity.

After detecting 210 the attempted file access not by thread B, the thread manager 101 can determine whether the file is currently be scanned. In some instances, thread B is currently scanning the file as the access is attempted. In other instances, thread B has completed the scan. If the thread manager 101 determines that the file is not currently being scanned, the thread manager 101 allows 214 the attempted access of the file. If the thread manager 101 determines that the file is currently being scanned, the thread manager 101 blocks 212 access to the file while the scan occurs.

Once the scan is completed, the thread manager 101 will no longer block access to the file. Thus, the thread manager 101 will allow 214 the file access to proceed.

Figure 3:
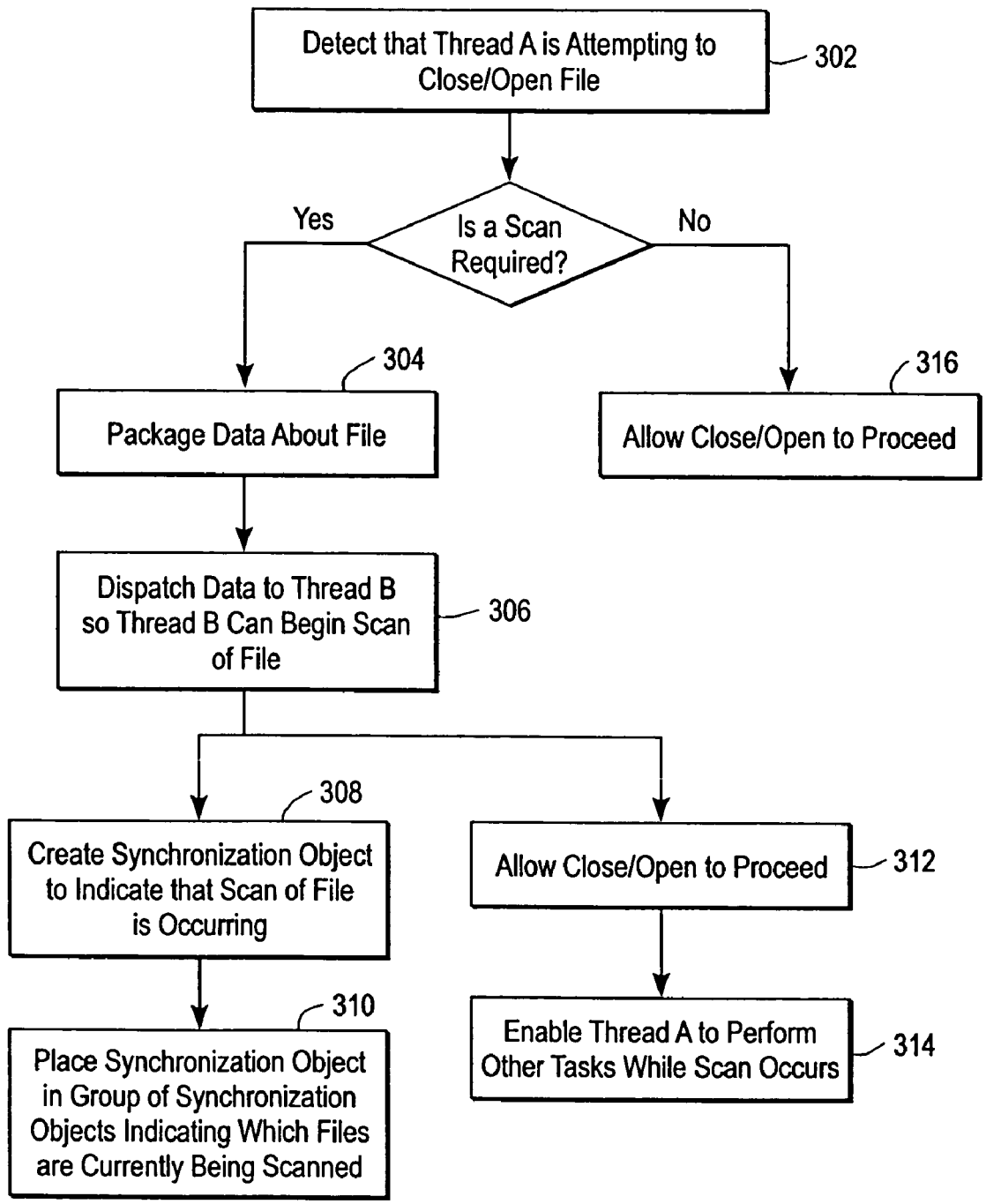
FIG. 3 is a flowchart illustrating steps for the thread manager performing a real time anti-virus scan of a file that a thread attempted to open or close, according to some embodiments of the present invention.
Figure 4:
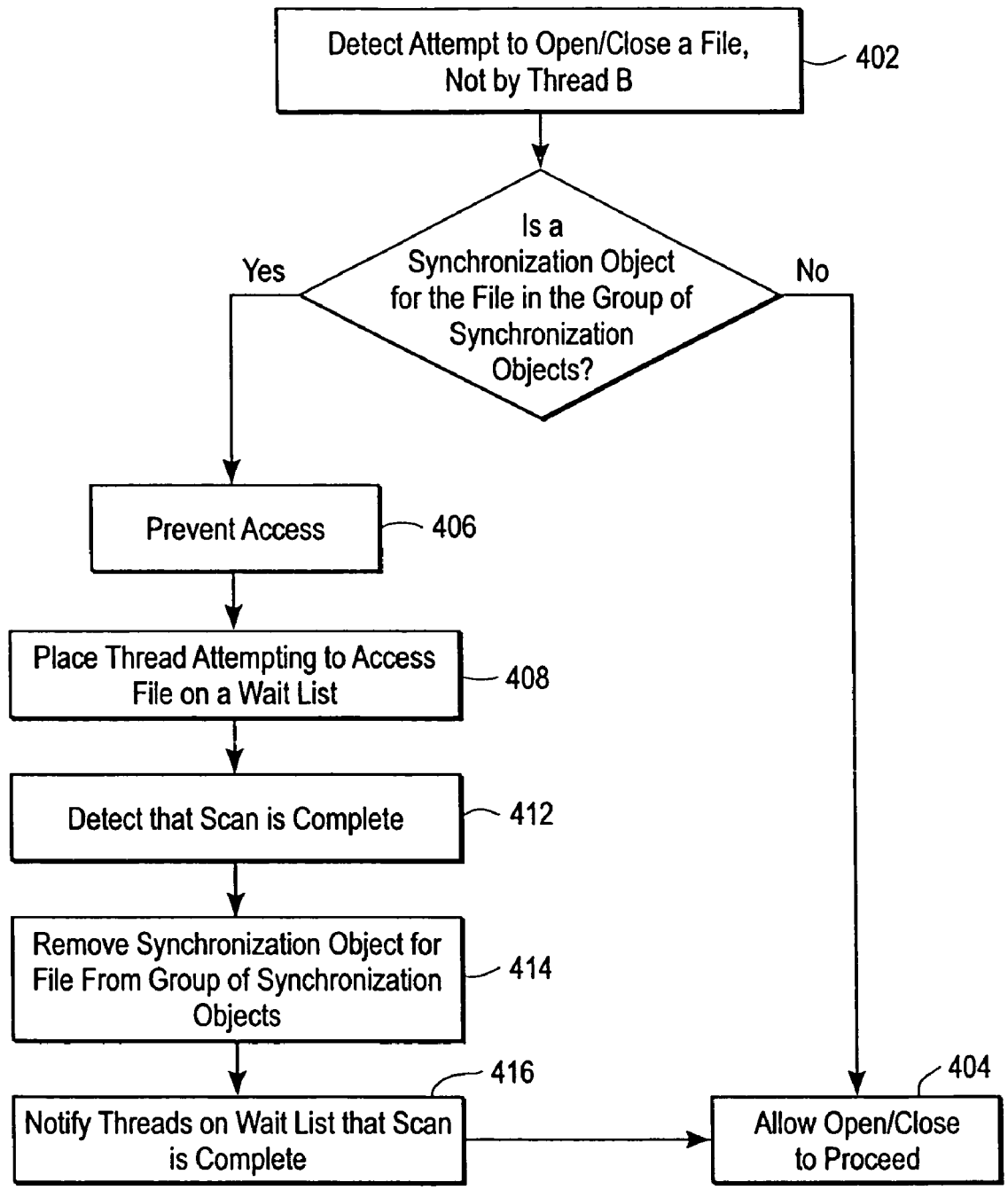
FIG. 4 is a flowchart illustrating steps for the thread manager controlling the closing or opening of a file during a scan of the file, according to some embodiments of the present invention.
Figure 5:
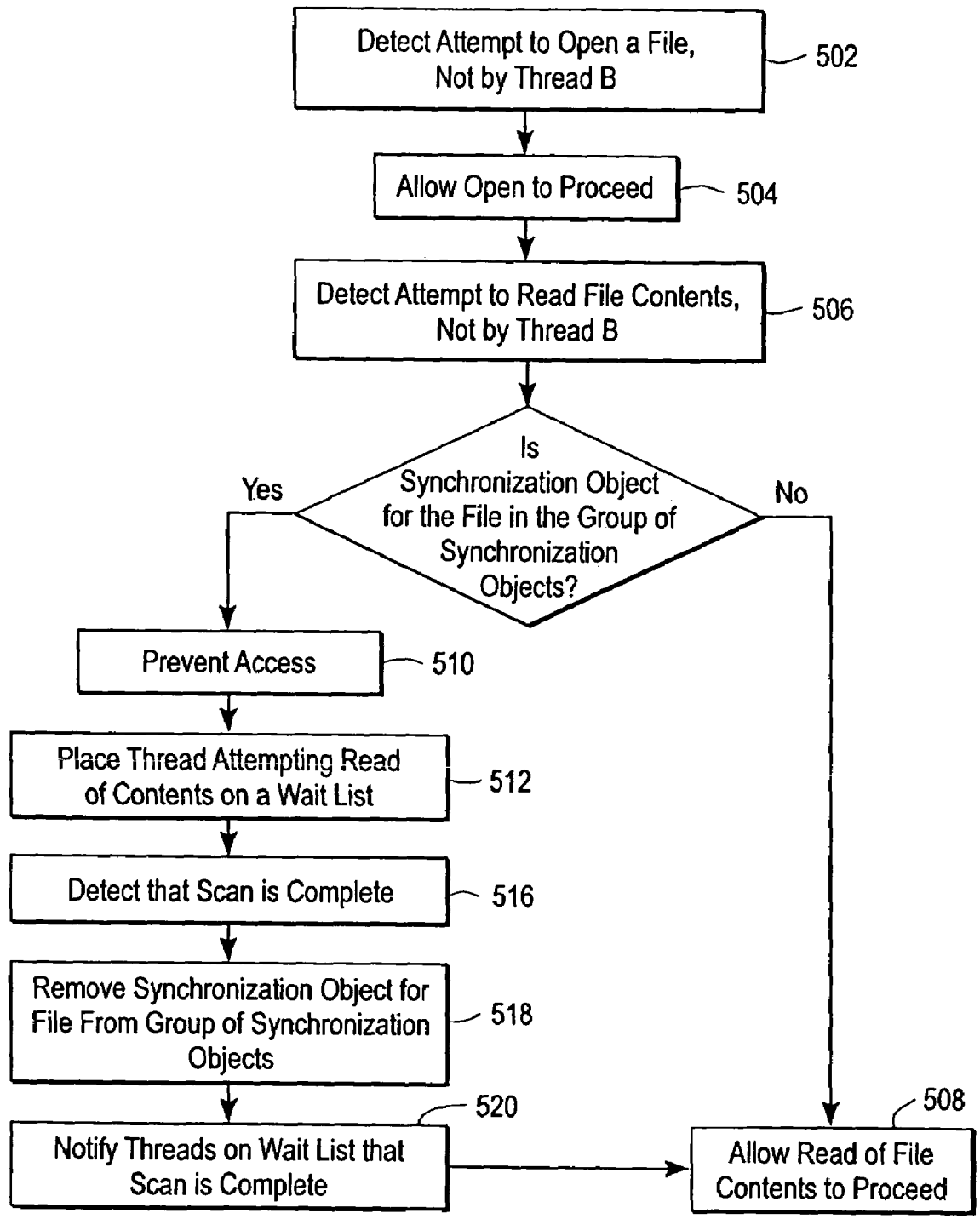
FIG. 5 is a flowchart illustrating steps for the thread manager controlling the reading of file contents during a scan of the file, according to some embodiments of the present invention.

As discussed above, there are a number of different activities concerning a file that could be initiated 202 by thread A in the present invention, triggering the method discussed in FIG. 2. As two examples, thread A could either attempt to close or to open the file. These two examples are discussed in more detail below in relation to FIG. 3. FIG. 3 provides a more detailed example of steps 202, 204, 206, and 208 of FIG. 2. In addition, there are a number of different examples of the thread manager detecting 210 attempted access of a file not by thread B. For example, there could be an attempt to close the file, open the file, or read the contents of the file. These examples are discussed in more detail below in relation to FIGS. 4 and 5. FIGS. 4 and 5 provide more detailed examples of steps 210, 212, and 214 of FIG. 2.

Referring now to FIG. 3, there is shown a flowchart of steps for semi-synchronous scanning during closing or opening of a file, according to some embodiments of the present invention. In some embodiments, the thread manager 101 detects 302 that thread 110 is attempting to access the file. For ease of readability, thread 110 is referred to here as thread A. In addition, multiple threads can attempt to close or open a file at a time, so what is referred to as thread A can comprise multiple threads.

Once the thread manager 101 has detected 302 that thread A is attempting to close or open a file, the thread manager 101 determines whether the file should be scanned for malicious code. For example, the thread manager 101 can be configured to require a scan of a file each time it is closed or opened if the file was modified in any way since the last scan of the file.

There are a number of ways in which the thread manager 101 can determine whether or not a scan should be conducted. For example, the thread manager 101 can make this determination by referring to some sort of cache or record of files, such as a clean file cache. The system 100 can be configured to keep track of all files that have been scanned, and which have not been modified since their last scan. The system 100 can keep a list or cache of all of the "clean files" that do not require scanning. For example, the clean file cache would not contain files in which the actual file content has been modified since the last scan of the file, and it would not contain new files or files that have been renamed since the last scan. In this example, it may also be necessary to flush the clean file cache each time updates of definitions of current malicious code become available. If the thread manager 101 finds a file in the clean file cache, the thread manager 101 will determine that the file does not need to be scanned. Alternatively, the system 100 could be configured to keep track of all modified or "dirty" files.

If a scan is not required, the thread manager 101 allows 316 the closing or opening of the file to proceed. If a scan is required, the thread manager 101 prepares for this scan. In preparing for the scan, the thread manager 101 packages 304 data about the file and dispatches 306 the data to another thread that will conduct the scan of the file. In the example of FIG. 3, this thread conducting the scan is referred to as thread B.

Once thread B has begun the scan of the file, the thread manager 101 simultaneously performs two separate paths of action, in some embodiments of the present invention. In one path of action, the thread manager 101 creates 308 a synchronization object to indicate that a scan of the file is occurring. The thread manager 101 then places 310 the synchronization object in a group of synchronization objects indicating which files are currently being scanned. In this manner, the thread manager 101 can track which files are being scanned at any given time, by referring to the group of synchronization objects. If the group contains a synchronization object for a particular file, then that file is currently being scanned. When the scan of a file is complete, the thread manager 101 can remove the synchronization object for that file from the group of synchronization objects, indicating that the scan has been completed. The group of synchronization objects can take on a number of different forms. For example, the group could include a list or a table of all files being scanned, or any other format for indicating which files are being scanned.

In a second path of action according to some embodiments of the present invention, the thread manager 101 allows 312 the close or open of the file to proceed. This step can occur before, after, or concurrently with the steps 308 and 310. Thus, the close or open of the file is not delayed during the creation of the synchronization object or the scanning of the file by thread B. Additionally, the thread manager 101 enables 314 thread A to perform other tasks not related to this file while the scan occurs. Thus, thread A is not delayed by the scanning of the file, since the scanning action is being conducted by thread B, rather than thread A. Also, the application with which thread A is associated is also free to perform other tasks and does not appear unresponsive to the user.

Referring now to FIG. 4, there is shown a flowchart illustrating the steps of the thread manager 101 controlling the closing or opening of a file during a scan of the file, according to some embodiments of the present invention. The thread manager 101 detects 402 an attempt to access the file not by thread B. This flowchart is illustrated as a continuation of the flowchart from FIG. 3, in which a file was being scanned by thread B, and an attempted access of that file not by thread B occurs. Thus, the steps of FIG. 4 only occur if such an attempted access of the file occurs.

Once the thread manager 101 has detected 402 the attempted access of the file, the thread manager 101 determines whether the file is currently being scanned. In the embodiment of FIG. 4, the thread manager 101 does this by determining if a synchronization object for the file is present in the group of synchronization objects. If a synchronization object for the file is not present in the group (the file is not currently being scanned), the thread manager 101 allows 404 the access to proceed. If a synchronization object for the file is present in the group (the file is currently being scanned), the thread manager 101 temporarily blocks 406 the access to the file. Thus, the thread manager 101 permits only thread B to access the file during the scan. All other threads are prevented 406 from accessing the file until the scan is complete.

In some embodiments, the thread manager 101 then places 408 the thread attempting file access on a waiting list. In this manner, the thread manager 101 can keep track of each thread attempting to access a file, since numerous threads can attempt to access the file during the scan. The waiting list can include a list of all threads that are waiting to access the file. The waiting list can alternatively be a table, a group, or any other structure or method for recording information regarding threads that are attempting to access a file and are currently prevented from access.

Thread B scans the file until the scan is complete. If malicious code is detected, any malicious content found can be removed, the file can be repaired, and any other necessary anti-virus actions can be conducted. The thread manager 101 detects 412 when the scan is completed and removes 414 the synchronization object for that file from the group of synchronization objects (indicating that the file is no longer in the process of being scanned). The thread manager 101 notifies 416 the threads on the waiting list that the scan has been completed.

Once the scan has been completed, the thread manager 101 allows 404 the file access to proceed. Thus, the threads that were on the waiting list are now permitted to access the file.

Referring now to FIG. 5, there is shown a flowchart illustrating the steps of the thread manager 101 controlling the reading of file contents during a scan of the file, according to some embodiments of the present invention. Malicious code that infects a file is less likely to cause a problem if the file is opened, but instead will more likely cause a problem if a thread attempts to read the contents of the file. Thus, in these embodiments, the thread manager 101 will determine, when the file is opened, whether or not it should be scanned. However, regardless of whether or not the file should be scanned, the opening of the file will be allowed to proceed. When there is an attempt to read the file, the thread manager 101 will determine if a scan is in progress. If so, the thread manager 101 will prevent access to the file until the scan is complete.

Similar to the methods of FIG. 4, in FIG. 5, the thread manager 101 detects 502 an attempt to open a file not by thread B. Also similar to FIG. 4, the flowchart of FIG. 5 is illustrated as a continuation of the flowchart from FIG. 3, in which a file was being scanned by thread B, and an attempted access of the file not by thread B occurs (i.e., thread A may have closed the file according to the steps of FIG. 3, and may now be attempting to open the file and read its contents according to the steps of FIG. 5). Thus, the steps of FIG. 5 only occur if such an attempted access of the file occurs.

In the embodiment of FIG. 5, once the thread manager 101 has detected 502 the attempt to open the file, the thread manager 101 allows 504 the open to proceed. In the embodiment of FIG. 5, the thread manager 101 then detects 506 an attempt to read the contents of the file not by thread B. In some embodiments, this step 506 may never occur if there is no attempt to read the contents of the file. For example, the file could simply be closed after it is opened.

When a thread attempts to read the contents of the file, the thread manager 101 determines whether the file is currently being scanned. To do this, the thread manager 101 determines if a synchronization object for the file is present in the group of synchronization objects. If not, the thread manager 101 allows 508 the read of the file contents to proceed. For example, thread B might have been scanning the file previously, and might have finished the scan. Thread A can open the file while thread B is scanning the file. However, if the thread A waits to read the contents of the file until thread B finishes the scan, then the thread A will not experience a delay when attempting to read the contents of the file.

If there is a synchronization object for the file in the group of synchronization objects (the file is currently being scanned), the thread manager 101 prevents access 510 to the file. The thread manager 101 places 512 the thread attempting to read the file contents on a waiting list. When the thread manager 101 detects 516 that the scan is complete, the thread manager 101 removes 518 the synchronization object for that file from the group of synchronization objects. The thread manager 101 notifies the threads on the waiting list that the scan is complete. The thread manager 101 then allows 508 the read of the file contents to proceed.

It is also possible to configure system 100 to conduct asynchronous or synchronous scanning. In asynchronous scanning, other threads are permitted to access the file while thread B is scanning the file. For example, system 100 can be configured to permit thread A to open the file, and then enable thread A to perform other tasks while the file is scanned. In an asynchronous system, thread A is not prevented from accessing the file during the scan, thereby allowing the application 114 to appear more responsive. However, there is a risk that the file being accessed could contain malicious code. For example, if thread A attempts to close or open a file during a scan, the system 100 can be configured to allow this file access, rather than delaying the access until the scan is completed. However, in the case where the file has been opened before the scan is complete, thread A might also attempt to read the contents of the file before the scan is complete, thereby putting the system 100 at risk of attack by malicious code. The system 100 can be configured to avoid this problem by allowing only certain file accesses (e.g., opening or closing a file) to occur unhindered during scanning, but by limiting other accesses (e.g., reading the contents of a file) that are more likely to compromise the safety of the system 100.

In synchronous scanning, thread A is prevented from initiating an activity concerning a file until the file is scanned. Attempts to access the file during the scan are also prevented until the scan is complete. Thus, safety is maximized since file accesses are prevented in both instances until scanning is complete, but the application 114 appears less responsive overall.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for performing an anti-virus scan of a file in real-time, the method comprising the steps of:
   using a computer to execute method steps comprising:
      a thread manager detecting that an activity concerning a file has been initiated by a first thread;
      responsive to the detection, the thread manager determining that a scan of the file should be conducted;
      the thread manager initiating the scan of the file by dispatching the scan to a second thread;
      the thread manager delaying completion of the activity by the first thread only long enough for the scan to be dispatched to the second thread;
      the thread manager enabling the first thread to complete the activity that was previously initiated concerning the file synchronously with the scan of the file by the second thread and enabling the first thread to perform other tasks synchronously with the scan of the file by the second thread;
      the thread manager blocking access to the file by other threads while the scan occurs;
      the thread manager detecting that a thread other than the second thread is attempting to access the file during the scan and after the first thread has completed the activity concerning the file; and
      the thread manager placing the thread attempting to access the file on a waiting list for accessing the file until the scanning is completed.

2. The method of claim 1 wherein the step of the thread manager detecting that an activity concerned a file has been initiated further comprises the thread manager determining that the first thread is attempting to close the file.

3. The method of claim 1 wherein the step of the thread manager detecting that an activity concerned a file has been initiated further comprises the thread manager determining that the first thread is attempting to open the file.

4. The method of claim 1 wherein the step of the thread manager detecting that an activity concerned a file has been initiated further comprises the thread manager determining that the first thread is attempting to read the contents of the file.

5. The method of claim 1 wherein the step of the thread manager dispatching the scan to a second thread further comprises the thread manager packaging data about the file and dispatching this data to the second thread.

6. The method of claim 1 further comprising the step of the thread manager creating a synchronization object indicating that the scan is occurring.

7. The method of claim 6 further comprising:
   the thread manager placing the synchronization object in a group of synchronization objects, wherein the group of synchronization objects indicates which files are currently being scanned; and
   the thread manager removing the synchronization object from the group when the scan of the file is finished.

8. The method of claim 1 wherein the step of the thread manager blocking access to the file while the scan occurs further comprises the thread manager blocking all threads other than the second thread from accessing the file while the scan occurs.

9. The method of claim 1 further comprising the steps of:
   the thread manager checking a group of synchronization objects to determine whether the file is currently being scanned;
   the thread manager finding that a synchronization object for the file is not in the group; and
   the thread manager permitting the file access to proceed.

10. The method of claim 1 further comprising the steps of:
    the thread manager checking a group of synchronization objects to determine whether the file is currently being scanned;
    the thread manager finding the file in the group of synchronization objects; and
    the thread manager blocking the file access from proceeding during the scan.

11. The method of claim 1 further comprising the step of the thread manager sending notification of the scan being completed, thereby notifying the thread attempting the file access that it can proceed in conducting the file access.

12. The method of claim 1 further comprising the steps of:
    the thread manager detecting a plurality of attempted accesses of the file by at least one thread; and
    the thread manager blocking each of the plurality of file accesses while the file is being scanned by the second thread.

13. The method of claim 12 further comprising the thread manager notifying the at least one thread that the scan is complete, thereby notifying the at least one thread that it can proceed in conducting the file access.

14. The method of claim 1, wherein the thread manager delaying completion of the activity by the first thread only long enough for the scan to be dispatched to the second thread further comprises the thread manager delaying the activity initiated by the first thread during the time that the scan is being dispatched to the second thread, and the thread manager then permitting the first thread to continue with that activity initiated for the file following the dispatch of the scan to the second thread.

15. A computer system for performing an anti-virus scan of a file in real time, the computer system comprising:
    a computer-readable storage medium storing executable software portions, comprising:
       a software portion configured detect that an activity concerning a file has been initiated by a first thread;
       a software portion configured to determine that a scan of the file should be conducted, responsive to the detection;
       a software portion configured to initiate the scan of the file by dispatching the scan to a second thread;
       a software portion configured to delay completion of the activity by the first thread only long enough for the scan to be dispatched to the second thread;
       a software portion configured to enable the first thread to complete the activity that was previously initiated concerning the file synchronously with the scan of the file by the second thread and enabling the first thread to perform other tasks synchronously with the scan of the file by the second thread;
       a software portion configured to block access to the file by other threads while the scan occurs;
       a software portion configured to detect that a thread other than the second thread is attempting to access the file during the scan and after the first thread has completed the activity concerning the file;

a software portion configured to place the thread attempting to access the file on a waiting list for accessing the file until the scanning is completed; and a processor configured to execute the software portions stored by the computer readable storage medium.

16. The system of claim 15 wherein the software portion configured to block access to the file while the scan occurs further comprises a software portion configured to block all threads other than the second thread from accessing the file while the scan occurs.

17. The system of claim 15 wherein the software portion configured to initiate the scan of the file by a second thread further comprises:

a software portion configured to package data to be dispatched to the second thread; and a software portion configured to track which files are currently being scanned.

18. The system of claim 15 further comprising:

a software portion configured to detect a plurality of attempted accesses of the file by at least one thread;

a software portion configured to block each of the plurality of file accesses while the file is being scanned by the second thread; and a software portion configured to release the at least one thread attempting to access the file to perform other tasks during the scanning of the file.

19. The system of claim 15 wherein a software portion configured to block access to the file while the scan occurs further comprises a software portion configured to determine that a thread other than the second thread is attempting to open the file, wherein the thread other than the second thread is prevented from opening the file until the second thread has completed the scan of the file.

20. The system of claim 15 wherein a software portion configured to block access to the file while the scan occurs further comprises a software portion configured to determine that a thread other than the second thread is attempting to open the file, wherein the thread other than the second thread is prevented from reading the contents of the file until the second thread has completed the scan of the file.

21. A computer readable medium storing a computer program product for performing an anti-virus scan of a file in real time, the computer program product comprising:

program code for detecting that an activity concerning a file has been initiated by a first thread;

program code for determining that a scan of the file should be conducted, responsive to the detection;

program code for initiating the scan of the file by dispatching the scan to a second thread;

program code for delaying completion of the activity by the first thread only long enough for the scan to be dispatched to the second thread;

program code for enabling the first thread to complete the activity that was previously initiated concerning the file synchronously with the scan of the file by the second thread and enabling the first thread to perform other tasks synchronously with the scan of the file by the second thread;

program code for blocking access to the file by other threads while the scan occurs;

program code for detecting that a thread other than the second thread is attempting
to access the file during the scan and after the first thread has completed the activity concerning the file; and program code for placing the thread attempting to access the file on a waiting list for accessing the file until the scanning is completed.

22. The computer program product of claim 21 wherein the program code for blocking access to the file while the scan occurs further comprises program code for blocking all threads other than the second thread from accessing the file while the scan occurs.

23. The computer program product of claim 21 further comprising:

program code for detecting a plurality of attempted accesses of the file by at least one thread;

program code for blocking each of the plurality of file accesses while the file is being scanned by the second thread; and program code for releasing the at least one thread attempting to access the file to perform other tasks during the scanning of the file.

24. The computer program product of claim 21 wherein program code for detecting that an activity concerning a file has been initiated by a first thread further comprises:

program code for determining that the first thread is closing the file;

program code for blocking the opening the file by threads other than the second thread until the second thread has completed the scan of the file.

25. The computer program product of claim 21 wherein program code for detecting that an activity concerning a file has been initiated by a first thread further comprises:

program code for determining that the first thread is opening the file;

program code for blocking the closing of the file by threads other than the second thread until the second thread has completed the scan of the file.

26. The computer program product of claim 21 wherein program code for detecting that an activity concerning a file has been initiated by a first thread further comprises:

program code for determining that the first thread is opening the file;

program code for blocking the reading of the contents of the file by threads other than the second thread until the second thread has completed the scan of the file.

* * * * *